United States Patent
Gonzalez et al.

(10) Patent No.: US 9,542,549 B2
(45) Date of Patent: Jan. 10, 2017

(54) TOOLBAR FOR SINGLE SIGN-ON AND NON-SINGLE SIGN-ON SITES, APPLICATIONS, SYSTEMS, AND SESSIONS

(75) Inventors: Christopher M. Gonzalez, Saint Petersburgh, FL (US); S. A. Vetha Manickam, Chennai (IN); Madan Ponna, Hyderabad (IN); Sharad Kumar, Badaun (IN); James Carleton Hicks, Keller, TX (US); Venkata Ramana Murthy Poludasu, Lewisville, TX (US); Dinyar Kavouspour, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 877 days.

(21) Appl. No.: 13/023,907

(22) Filed: Feb. 9, 2011

(65) Prior Publication Data
US 2012/0204249 A1   Aug. 9, 2012

(51) Int. Cl.
*G06F 7/00* (2006.01)
*G06F 21/41* (2013.01)

(52) U.S. Cl.
CPC .................................... *G06F 21/41* (2013.01)

(58) Field of Classification Search
None
See application file for complete search history.

(56) References Cited

U.S. PATENT DOCUMENTS

| | | | |
|---|---|---|---|
| 7,725,605 B2* | 5/2010 | Palmeri et al. | 709/246 |
| 8,220,039 B2* | 7/2012 | Gonzalez et al. | 726/9 |
| 2002/0087588 A1* | 7/2002 | McBride et al. | 707/204 |
| 2004/0039827 A1* | 2/2004 | Thomas et al. | 709/228 |
| 2008/0154774 A1* | 6/2008 | Dennison et al. | 705/51 |
| 2008/0307350 A1* | 12/2008 | Sabatelli et al. | 715/779 |
| 2009/0126000 A1* | 5/2009 | Andreev et al. | 726/8 |
| 2009/0199277 A1* | 8/2009 | Norman et al. | 726/5 |
| 2009/0307351 A1* | 12/2009 | Raja et al. | 709/224 |
| 2010/0057845 A1* | 3/2010 | Thomas et al. | 709/203 |
| 2010/0146611 A1* | 6/2010 | Kuzin et al. | 726/8 |
| 2010/0174758 A1* | 7/2010 | Radenkovic et al. | 707/803 |
| 2011/0209064 A1* | 8/2011 | Jorgensen et al. | 715/733 |
| 2011/0277027 A1* | 11/2011 | Hayton et al. | 726/8 |
| 2011/0307946 A1* | 12/2011 | Hilerio et al. | 726/7 |
| 2012/0084570 A1* | 4/2012 | Kuzin et al. | 713/182 |
| 2012/0185391 A1* | 7/2012 | Sirota | 705/44 |
| 2012/0204248 A1* | 8/2012 | Gonzalez et al. | 726/8 |

* cited by examiner

*Primary Examiner* — Monica C King

(57) ABSTRACT

A method including receiving a request to connect to a single sign-on site, a non-single sign-on site, a system, a mainframe, or to use a mainframe or user device application; determining, by a toolbar of a user device, whether a user is authorized to connect to, initiate, or use the single sign-on site, the non-single sign-on site, the system, the mainframe, the mainframe or user device application; selecting, by the toolbar, one or more user credentials to allow the user to connect to, initiate, or use the single sign-on site, the non-single sign-on site, the system, the mainframe, the mainframe or the user device application when it is determined that the user is authorized; and signing-on, by the toolbar, to the single sign-on site, the non-single sign-on site, the system, the mainframe, the mainframe or user device application based on the one or more user credentials.

25 Claims, 13 Drawing Sheets

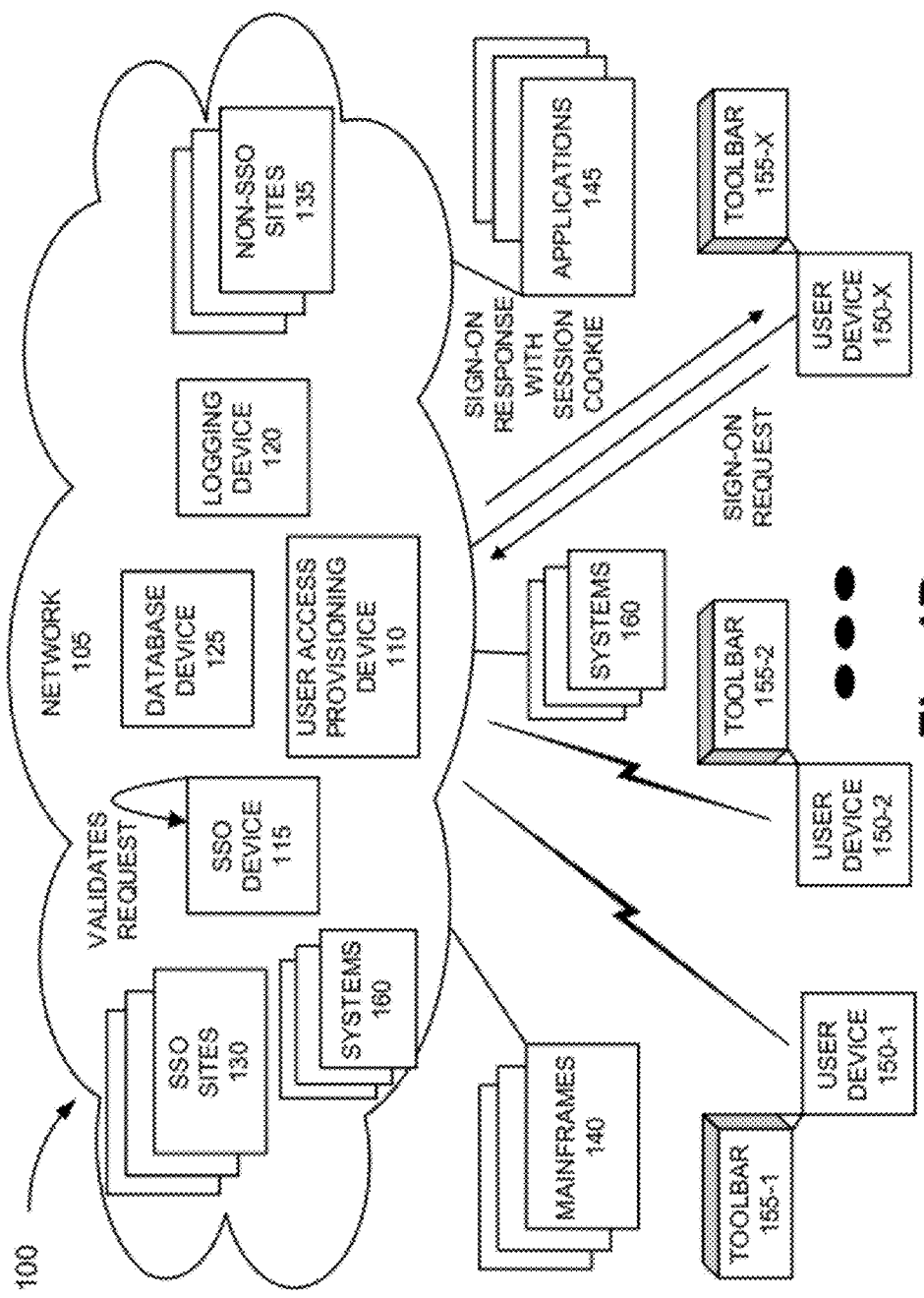

TOOLBAR FOR SINGLE SIGN-ON AND NON-SINGLE SIGN-ON SITES, APPLICATIONS, SYSTEMS, AND SESSIONS

BACKGROUND

Network providers may provide single sign-on services to users so that users may access multiple web sites based on a single log-on.

BRIEF DESCRIPTION OF THE DRAWINGS

FIGS. 1B-1E are diagrams illustrating an exemplary process for signing-on to the toolbar;

DETAILED DESCRIPTION OF PREFERRED EMBODIMENTS

Figure 1A:
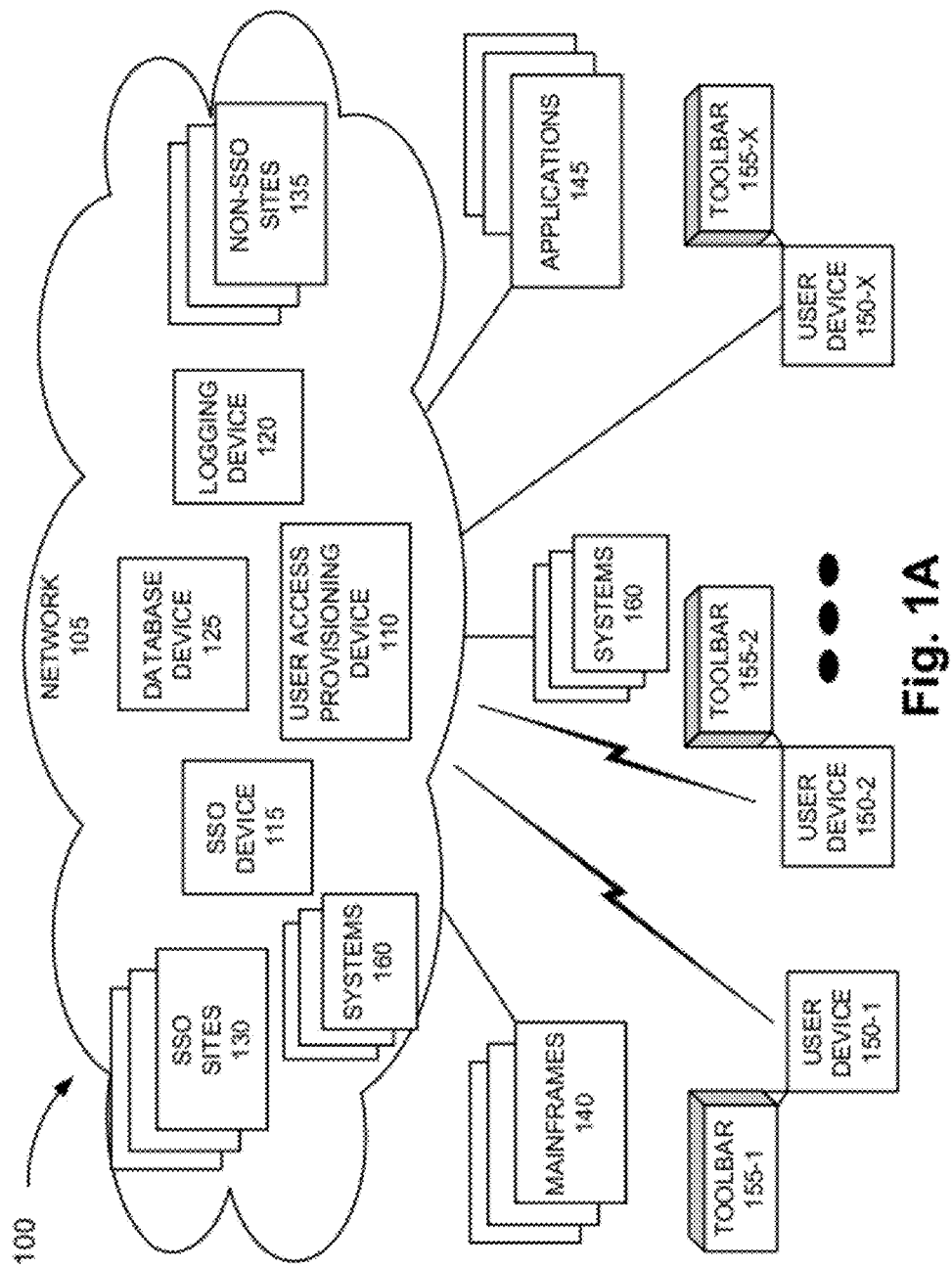
FIG. 1A is a diagram illustrating an exemplary embodiment of an environment that includes a toolbar that provides access and use of single sign-on and non-single sign-on sites, sessions, systems, and applications.

The following detailed description refers to the accompanying drawings. The same reference numbers in different drawings may identify the same or similar elements. Also, the following detailed description does not limit the invention.

The term "network," as used herein, is intended to be broadly interpreted to include a wireless network (e.g., mobile network, cellular network, non-cellular network, etc.) and/or a wired network. By way of example, the network may include the Internet, an intranet, a wide area network, a local area network, a private network, a public network, an enterprise network, etc. In this regard, the embodiments described herein may be implemented within a variety of network types.

According to exemplary embodiments, a user device may include an application that provides sign-on service to various types of resources that may be available to a user. For example, the application may permit the user to access and use various sites, sessions, systems, and applications, as well as provide an automated sign-on (e.g., login) to these sites, sessions, systems, and applications. By way of example, the application may perform automated processes pertaining to the logging into single-sign on (SSO) protected sites (e.g., Netegrity protected sites, web sites, company or proprietary sites, Intranet sites, Internet sites, etc.), non-SSO protected sites (e.g., non-Netegrity protected sites, web sites, company sites, proprietary sites, intranet sites, Internet sites, etc.), mainframe sessions and mainframe applications (e.g., Hummingbird and Attachmate mainframe sessions, applications), systems (e.g., network devices (e.g., a server, a switch, a router, a Universal Serial Bus (USB) device, a meter, etc.), user devices (e.g., a terminal, a television and set top box, a mobile device, a handheld device, a stationary device, etc.), another type of device or component, etc.), and other types of applications (e.g., desktop applications, Windows Forms-based applications, line-of-business (LOB) applications (e.g., department-based applications, company-based applications, etc.), common applications (e.g., applications available to all LOBs, applications available to all users, etc.)).

According to an exemplary embodiment, the application may take the form of a toolbar. According to other embodiments, the application may take the form of another type of user interface (UI). The term "toolbar," as used herein, is intended to include various types of user interfaces, such as, a toolbar, icon(s), menu(s), window(s), drop-down list(s), and/or other types of graphical or non-graphical user interface(s). According to an exemplary embodiment, the toolbar may be device agnostic and capable of operating on various types of user devices and operating systems. The toolbar may act as an interface between the user and sites, sessions, systems, and application. For example, the toolbar may include user interfaces that permit a user to select a particular sign-on site, non-single sign-on site, mainframe session, mainframe application, system, or user device application. According to an exemplary embodiment, the toolbar may correspond to a client-based application.

According to an exemplary embodiment, the toolbar may include a startup monitoring and authorizing function. For example, when a user chooses to select a particular site, session, system, or application not via the toolbar but elsewhere (e.g., the desktop, the taskbar, the system tray, etc.), the startup monitoring and authorizing function may detect the user's selection based on a monitoring of operating system events. Additionally, the startup monitoring and authorizing function may determine whether the user is authorized to access and use the particular site, etc., based on identifying the particular site, etc., and comparing this information to the user's user profile information.

According to an exemplary embodiment, the toolbar may use different types of user credentials pertaining to an automated sign-on to sites, sessions, systems, and applications. For example, single credentials may include credentials that may be used to sign-on to a single site, session, system, or application, and group credentials may include credentials that may be used to sign-on to multiple sites, sessions, systems, or applications. According to other exemplary embodiments, user credentials may be divided into additional and/or different categories than those set forth herein. The user credentials may include, for example, a user identifier (e.g., a name, a company identifier, a department identifier, a device identifier (e.g., a network address, an equipment identifier, etc.)), a password, a challenge answer, and/or other type of credential information.

According to an exemplary embodiment, the toolbar may provide access and use of sites, sessions, systems, and applications based on user profile information. For example, user profile information may include user identifier information (e.g., a name, company identifier, department identifier, device identifier); sites, sessions, systems, and applications the user is authorized to access and use; credential information (e.g. password information, user identifier, etc.)

pertaining to the sign-on to sites, sessions, systems, and applications; membership in groups; default page(s), user preferences, etc.

According to an exemplary embodiment, the toolbar may include a credential sensing function and a credential supplying function. The credential sensing function may automatically monitor user input when a site, a session, a system, and an application may be invoked by the user, but user credentials are not available. For example, the credential sensing function may monitor operation system (OS) event(s). According to an exemplary embodiment, the credential sensing function may automatically monitor user input regardless of whether the user invokes the site, session, system, or application via the toolbar or elsewhere (e.g., via a system tray, via a desktop, via a taskbar, etc.). According to an exemplary embodiment, the credential sensing function may obtain or capture the user credentials, when the user input's his/her credentials during the monitoring, and save the user credentials. According to an exemplary embodiment, the credential supplying function may automatically supply user credentials to the site, the session, the system, or the application to permit an automated sign-on.

According to an exemplary embodiment, the toolbar may include a cookie manager function. The cookie manager function may manage the life of a session cookie pertaining to a single sign-on session. For example, the cookie manager function may refresh a time-to-live of the session cookie when the user remains active on the user device within a particular time period. When the cookie manager function determines that the user is inactive on the user device beyond a particular period of time, the cookie manager function may permit the session cookie to expire.

FIG. 1A is a diagram illustrating an exemplary embodiment of an environment that includes a toolbar that provides access and use of single sign-on and non-single sign-on sites, sessions, and applications. As illustrated, an exemplary environment 100 may include a network 105 including a user access provisioning device 110, an SSO device 115, a logging device 120, a database device 125, single sign-on (SSO) sites 130, and non-SSO sites 135. Environment 100 may also include mainframes 140, applications 145, user devices 150-1 through 150-X (referred to as user devices 150 or user device 150) including toolbars 155-1 through 155-X (referred to as toolbars 155 or toolbar 155), and systems 160 (referred to as systems 160 or system 160).

The number of devices and configuration in environment 100 is exemplary and provided for simplicity. In practice, environment 100 may include additional devices, fewer devices, different devices, and/or differently arranged devices than those illustrated in FIG. 1A. For example, mainframes 140 and/or applications 145 may reside in network 105. Also, according to other embodiments, one or more functions and/or processes described as being performed by a particular device in environment 100 may be performed by a different device or multiple devices. Additionally, or alternatively, one or more functions and/or processes described as being performed by multiple devices may be performed by different devices or a single device.

Although FIG. 1A illustrates separate instances of user access provisioning device 110, SSO device 115, logging device 120, and database device 125, according to other embodiments, two or more of these devices may be combined. For example, user access provisioning device 110 and logging device 120 may be combined, or logging device 120 and database device 125 may be combined, etc. Environment 100 may include wired and/or wireless connections among the devices illustrated.

Network 105 may include one or multiple networks of one or multiple types. User access provisioning device 110 may include a network device that permits users to provision processes pertaining to an automated sign-on to sites, sessions, systems, and applications. As an example, user access provisioning device 110 may be implemented by a server (e.g., a web server or some other type of network server) or a peer device.

SSO device 115 may include a network device that provides SSO services. According to an exemplary embodiment, SSO device 115 may provide SSO services pertaining to the access and use of web sites, web applications, network sites, and/or network-based applications. As an example, SSO device 115 may be implemented by a server (e.g., a web server, a proxy server, etc.), an access point, a security device, or a gateway device.

Logging device 120 may include a network device that logs information with database device 125. As an example, logging device 120 may be implemented by a server (e.g., a web server, a proxy server, etc.) or some other type of network computer.

Database device 125 may include a network device that stores information. For example, database device may store user profile information. The user profile information may include, for example, one or multiple user identifiers (e.g., user name, company identifier, department identifier, etc.), user credential information (e.g., password information, user identifier, etc.) pertaining to the sign-on to sites, sessions, systems, and applications, membership in groups, default page(s), user preferences, sign-on information (e.g., path to applications, URIs, URLs, etc.), user role information, etc. As an example, database device 125 may be implemented by a server (e.g., a database server, a web server, etc.), a computational device (e.g., a network computer, etc.), or some other type of repository device.

SSO sites 130 may include network devices that provide assets to users. For example, SSO sites 130 may correspond to web sites or some other type of network-based sites that provides applications or some other resource (e.g., information, etc.). SSO sites 130 may be provisioned for SSO services. Non-SSO site 135 may include network devices that provide assets to users. For example, non-SSO sites 135 may correspond to web sites or some other type of network-based sites that provide applications or some other resource (e.g., information, etc.). Non-SSO sites 135 may not be provisioned for SSO services.

Mainframes 140 may include devices that provide assets to users. For example, mainframes 140 may correspond to computers (e.g., mainframe computers, etc.) that provide applications or some other resource (e.g., information, etc.). Applications 145 may correspond to software applications, such as, for example, desktop applications, Windows Forms-based applications, LOB applications (e.g., department-based applications, company-based applications, etc.), common applications (e.g., applications available to all LOBs, applications available to all users, etc.)), etc.

User device 150 may include a device having the capability to communicate with other devices, systems, networks, and/or the like. In practice, user device 150 may correspond to a stationary device, a portable device, a handheld device, a mobile device, a vehicle-based device, or some other type of user device. As an example, user device 150 may correspond to a wireless telephone, a computer (e.g., a desktop, a laptop, a palmtop, a netbook, a tablet, etc.), a personal digital assistant (PDA), or a personal communication system (PCS) terminal. User device 150 may operate according to one or multiple communication standards, protocols, etc. User device 150 may communicate via a wireless connection and/or via a wired connection. Toolbar 155 may correspond to the toolbar, as described herein.

System 160 may include a device having the capability to communicate with other devices, systems, networks, and/or the like. In practice, system 160 may correspond to a user device (e.g., user device 150), a network device (e.g., a server, a router, a switch, etc.), some other type of device or component having communication capability, and/or a component or an application of a device.

FIGS. 1B-1E are diagrams illustrating an exemplary process for signing-on to toolbar 155. In this example, toolbar 155 may be subject to an SSO service. According to other embodiments, toolbar 155 may not be subject to an SSO service.

Referring to FIG. 1B, in this example, assume a user launches toolbar 155-X residing on user device 150-X. During a start-up process, toolbar 155-X may prompt the user for SSO credentials (e.g., a user identifier, a password, etc.). In response, the user may enter his/her SSO credentials. Once received from the user, user device 150-X and toolbar 155-X may send a sign-on request to SSO device 115. The sign-on request may include the received SSO credentials. As illustrated, SSO device 115 may validate the sign-on request based on a determination that the SSO credentials are valid. For example, SSO device 115 may compare the received SSO credentials to entries in a database that stores SSO credentials. In this example, it may be assumed that the user provided SSO credentials that are valid.

As further illustrated, upon successful validation, SSO device 115 may send a sign-on response to user device 150-X and toolbar 155-X indicating that the user is validated. The sign-on response may include a session cookie. The session cookie may include, for example, a user identifier and a date and time stamp.

Figure 1C:
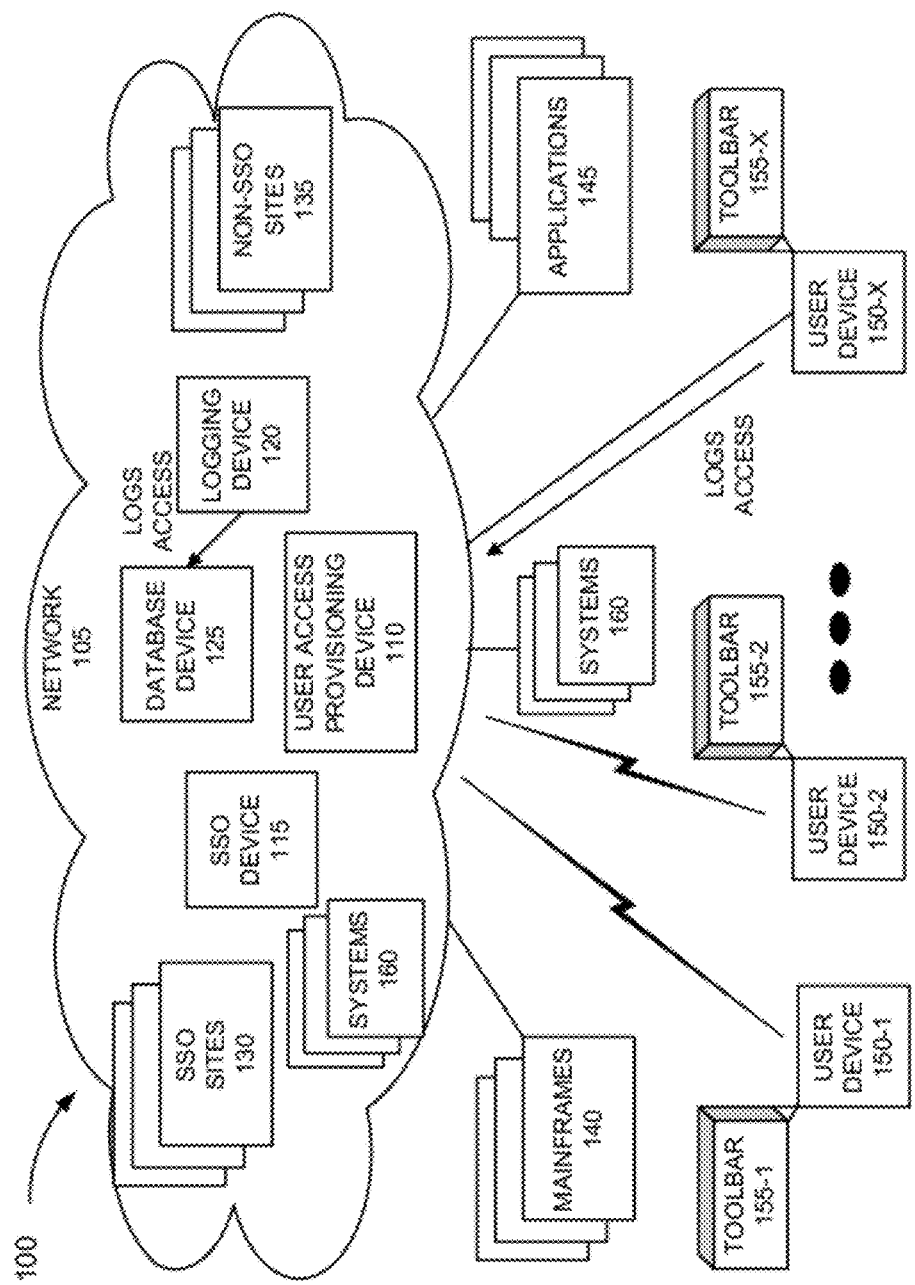

Referring to FIG. 1C, user device 150-X and toolbar 155-X may log the user's access with network 105. For example, user device 150-X and toolbar 155-X may send a log entry to logging device 120. The log entry may include, for example, a user identifier, a device identifier, and an indicator (e.g., a flag, etc.) that the user has been validated. Logging device 120 may log the log entry with database device 125.

Figure 1D:
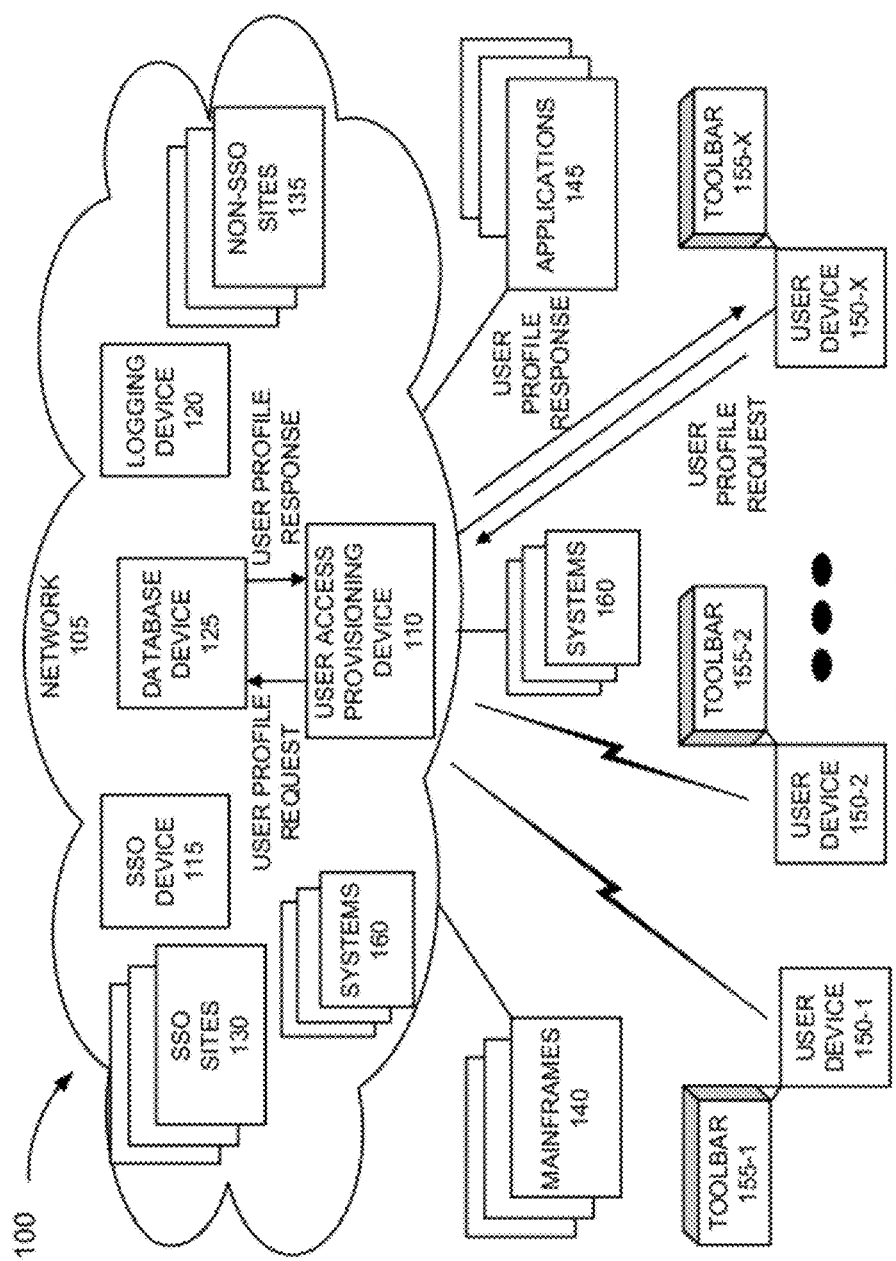

Referring to FIG. 1D, user device 150-X and toolbar 155-X may send a user profile request to user access provisioning device 110. The user profile request may include a user identifier. Upon receipt of the user profile request, user access provisioning device 110 may obtain a user profile belonging to the user. For example, user access provisioning device 110 may send a user profile request to database device 125 and database device 125 may send a user profile response to user access provisioning device 110. User access provisioning device 110 may send a user profile response to user device 150-X and toolbar 155-X. The user profile response may include the user's user profile information.

Figure 1E:
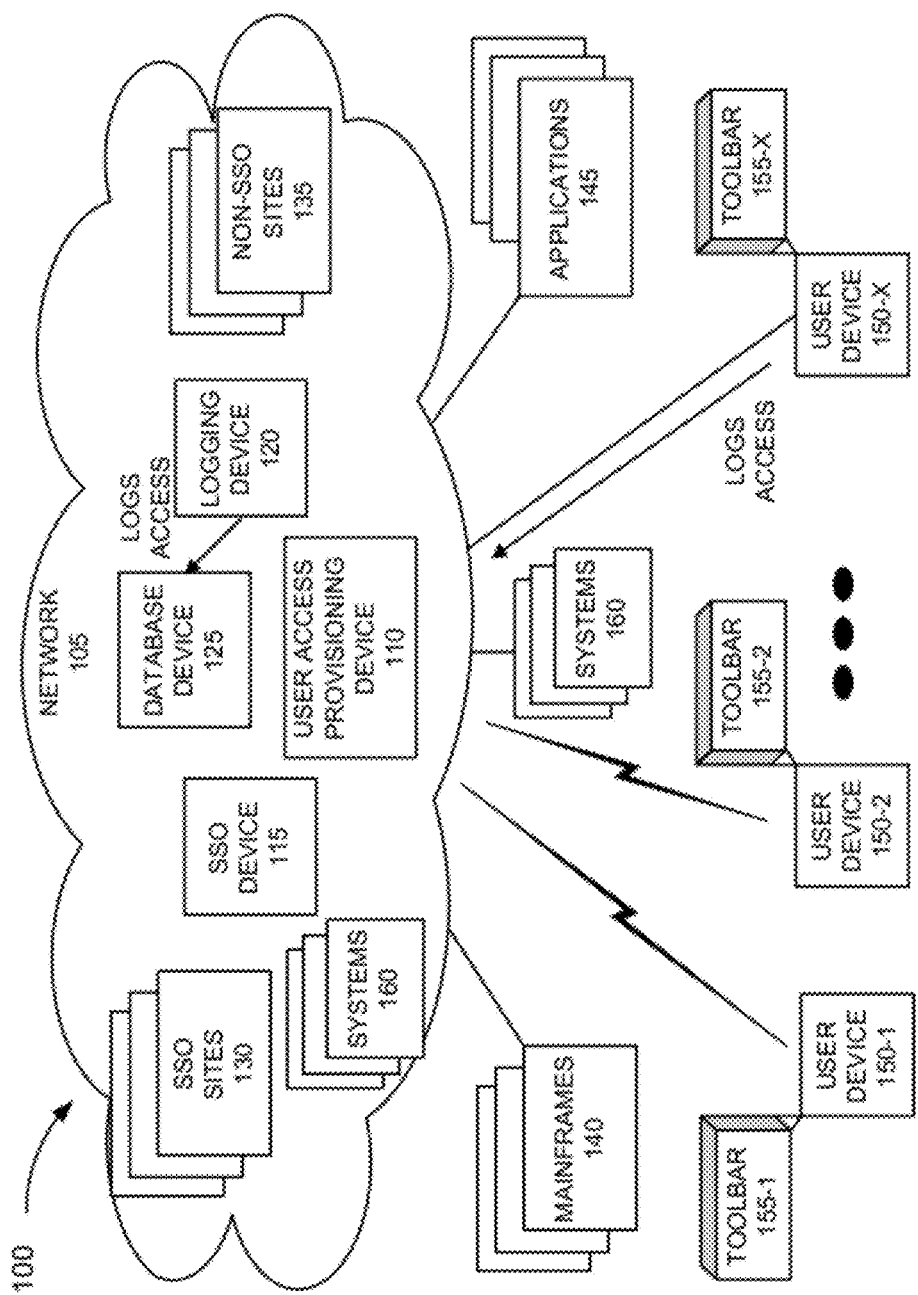

Referring to FIG. 1E, upon receipt of the user profile information, user device 150-X and toolbar 155-X may send a log entry to database 125 via logging device 120. The log entry may include information indicating that the user successfully signed-on to toolbar 155-X. The user may then access and use SSO sites 130, non-SSO sites 135, mainframes 140, applications 145, and/or systems 160, via toolbar 155-X, in accordance with the received user profile information.

Figure 2:
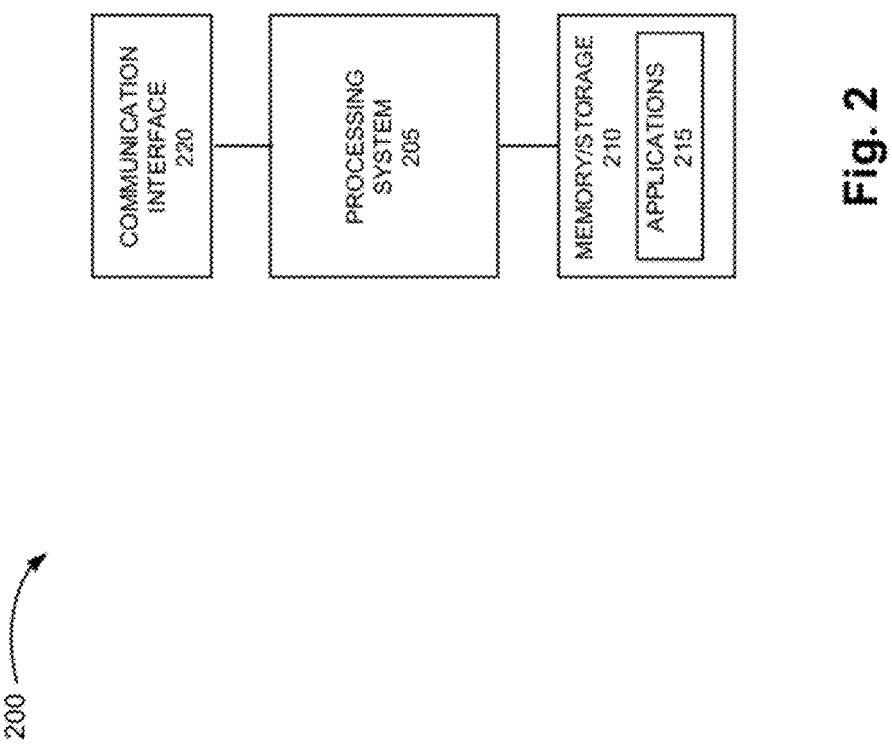
FIG. 2 is a diagram illustrating exemplary components of a device that may correspond to one or more of the devices in the environment illustrated in FIGS. 1A-1E.

FIG. 2 is a diagram illustrating exemplary components of a device 200 that may correspond to one or more of the devices in environment 100. For example, device 200 may correspond to user access provisioning device 110, SSO device 115, logging device 120, database device 125, SSO sites 130, non-SSO sites 135, mainframes 140, user device 150, and/or systems 160, depicted in FIGS. 1A-1E. As illustrated, device 200 may include a processing system 205, memory/storage 210 including applications 215, and a communication interface 220. According to other implementations, device 200 may include fewer components, additional components, different components, and/or a different arrangement of components than those illustrated in FIG. 2 and described herein. For example, device 200 may include input components (e.g., a display, a keyboard, a keypad, a microphone, an input port, etc.) and output components (e.g., a display, a speaker, an output port, etc.).

Processing system 205 may include one or multiple processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion of operation(s) performed by device 200. Processing system 205 may perform one or multiple operations based on an operating system and/or various applications (e.g., applications 215). Processing system 205 may access instructions from memory/storage 210, from other components of device 200, and/or from a source external to device 200 (e.g., another device, a network, etc.).

Memory/storage 210 may include one or multiple memories and/or one or multiple secondary storages. For example, memory/storage 210 may include a random access memory (RAM), a dynamic random access memory (DRAM), a read only memory (ROM), a programmable read only memory (PROM), a flash memory, and/or some other type of storing medium (e.g., a computer-readable medium, a compact disk (CD), a digital versatile disk (DVD), or the like). Memory/storage 210 may include a hard disk (e.g., a magnetic disk, an optical disk, a magneto-optic disk, a solid state disk, etc.) or some other type of medium, along with a corresponding drive. Memory/storage 210 may be external to and/or removable from device 200, such as, for example, a Universal Serial Bus (USB) memory stick, a dongle, a hard disk, mass storage, off-line storage, or the like.

The term "computer-readable medium," as used herein, is intended to be broadly interpreted to include, for example, a memory, a secondary storage, a CD, a DVD, or another type of tangible storage medium. Memory/storage 210 may store data, application(s), and/or instructions related to the operation of device 200.

Applications 215 may include software that provides various services or functions. For example, applications 215 may include applications that perform various network-related and/or communication-related functions.

Communication interface 220 may permit device 200 to communicate with other devices, networks, systems and/or the like. Communication interface 220 may include one or multiple wireless interfaces and/or wired interfaces. Communication interface 220 may include one or multiple transmitters, receivers, and/or transceivers. Depending on the network, communication interface 220 may include interfaces according to one or multiple communication standards.

Device 200 may perform operations in response to processing system 205 executing software instructions stored by memory/storage 210. For example, the software instructions may be read into memory/storage 210 from another memory/storage 210 or from another device via communication interface 220. The software instructions stored in memory/storage 210 may cause processing system 205 to perform processes described herein. Alternatively, according to another implementation, device 200 may perform processes based on the execution of hardware (e.g., processing system 205, etc.), the execution of hardware and firmware, or the execution of hardware, software (e.g., applications 215), and firmware.

Figure 3:
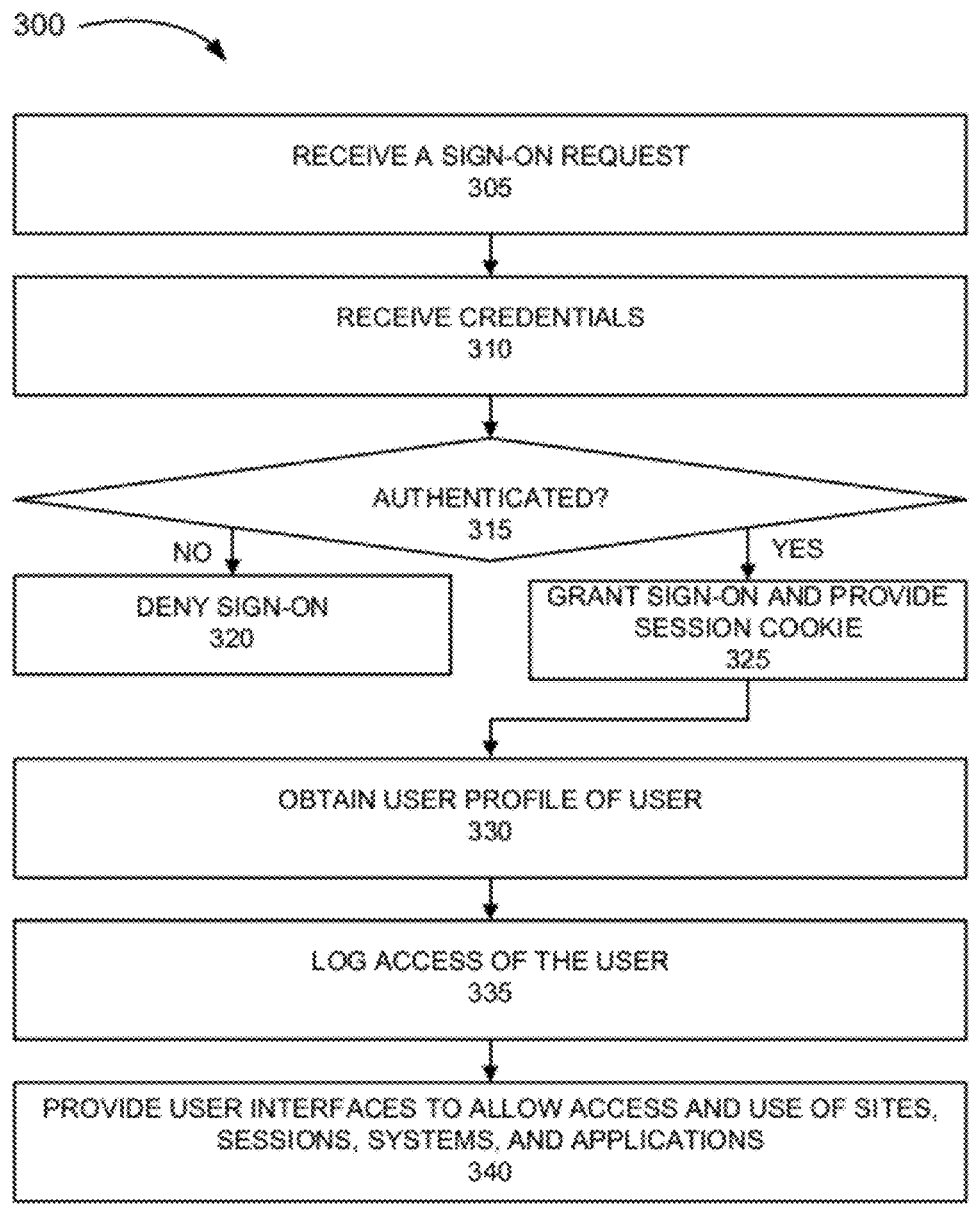
FIG. 3 is a flow diagram illustrating an exemplary process for signing into the toolbar that provides access and use of sites, sessions, systems, and applications.

FIG. 3 is a flow diagram illustrating an exemplary process for signing into the toolbar that provides access and use of sites, sessions, and applications.

A sign-on request may be sent (block 305). For example, as previously described, during a startup process, toolbar 155 may prompt a user, via user device 150, to sign-on to toolbar 155. Toolbar 155 may receive user credentials (e.g., SSO credentials or some other type of sign-on credentials). Toolbar 155 may send a sign-on request, via user device 150, to an authenticating device (e.g., SSO device 115). The sign-on request may include the user credentials.

Credentials may be received (block 310). For example, as previously described, SSO device 115 may receive the sign-on request that includes the user credentials. SSO device 115 may determine whether the user credentials are valid.

It may be determined whether a user is authenticated (block 315). For example, as previously described, SSO device 115 may determine whether the user is authenticated and/or authorized to sign-on to toolbar 155 based on the received credentials.

If it is determined that the user is not authenticated (block 315—NO), the user may be denied sign-on (block 320). For example, SSO device 115 may send a sign-on response that indicates that sign-on is denied. Additionally, SSO device 115 may not send toolbar 155 a session cookie. Additionally, for example, toolbar 155 may log an error report with database device 125 via logging device 120 based on the received sign-on response. Toolbar 155 may also store the error report locally (e.g., on user device 150) and/or perform other security measures (e.g., depending on the number of previous failed attempts, etc.).

If it is determined that the user is authenticated (block 315—YES), sign-on and use of toolbar 155 may be granted and a session cookie may be provided (block 325). For example, SSO device 115 may send a sign-on response that includes a session cookie to toolbar 155 via user device 150. The session cookie may include user access information, such as, for example, a user identifier and a timestamp (e.g., date, time, etc.) corresponding to a time that the sign-on is granted.

A user profile of the user may be obtained (block 330). For example, as previously described, user device 150 and toolbar 155 may obtain user profile information associated with the user from a database (e.g., database device 125).

The user's access may be logged (block 335). For example, as previously described, user device 150 and toolbar 155 may log the user's successful sign-on to toolbar 155 with a database (e.g., database device 125).

User interfaces to allow access and use of sites, sessions, systems, and applications may be provided (block 340). For example, as previously described, toolbar 155 may provide user interfaces to allow the user to access and use SSO sites 130, non-SSO sites 135, mainframes 140, applications 145, and/or systems 160 based on the user profile information. For example, the user profile information may include, among other information, sites, sessions, systems, and applications that the user is authorized to access and use. Toolbar 155 may provide an automated sign-on to sites, sessions, systems, and applications that the user is authorized to access and use.

Although FIG. 3 illustrates an exemplary process 300, according to other embodiments, process 300 may include additional operations, fewer operations, and/or different operations than those illustrated in FIG. 3 and described. Additionally, or alternatively, according to other embodiments, one or more operations described as being performed by a particular device, may be performed by a different device or a combination of devices.

As previously described, according to an exemplary embodiment, toolbar 155 may include a credential sensing function and a credential supplying function. The credential sensing function may automatically monitor user input when a site, session, session, and application is invoked by the user, but user credentials are not available. As an example, the credential sensing function may be triggered for a first time user of a site, a session, a system, or an application. The credential sensing function may obtain or capture the user credentials, when the user inputs his/her credentials during the monitoring, and save the user credentials (e.g., with the user profile information, database device 125, etc.). The credential supplying function may automatically supply the obtained or captured user credentials to a site, a session, a system, or an application that is being invoked as a part of an automated sign-on.

Figure 4A:
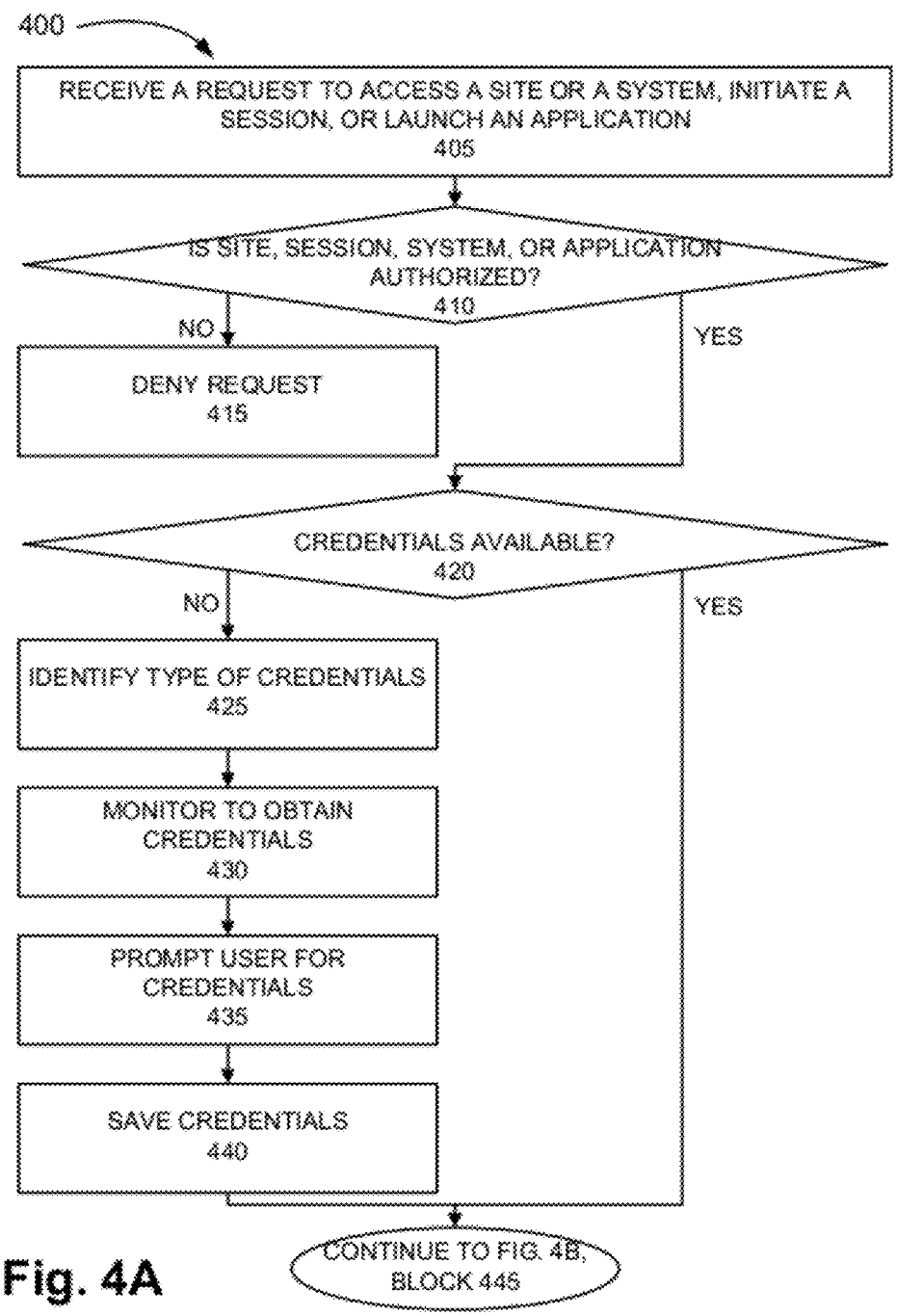
FIGS. 4A and 4B are flow diagrams illustrating an exemplary process pertaining to an exemplary embodiment of a credential sensing and supplying function of the toolbar.
Figure 4B:
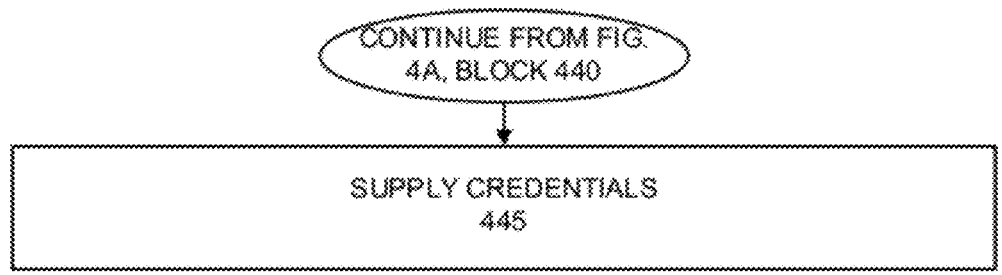

FIGS. 4A and 4B are flow diagrams illustrating an exemplary process 400 pertaining to an exemplary embodiment of the credential sensing and supplying of toolbar 155. According to an exemplary embodiment, process 400 may be performed by toolbar 155 when a user invokes a site, a session, or an application via toolbar 155. For example, toolbar 155 may provide a user interface that permits the user to select various sites, sessions, and applications. According to another exemplary embodiment, process 400 may be performed by toolbar 155 when a user invokes a site, a session, or an application from, for example, a graphical element displayed in a taskbar, a system tray, or on a desktop (i.e., not via toolbar 155).

A request to access a site or a system, initiate a session, or launch an application may be received (block 405). For example, toolbar 155 may detect when a user's input pertains to accessing a site or a system, initiating a session, or launching an application. By way of example, the user may select a particular application to start via toolbar 155, or the user may select an icon displayed on a desktop or in a taskbar or system tray (i.e., not via toolbar 155). As previously described, the startup monitoring and authorizing function of toolbar 155 may detect when the user selects a site, session, system, or application from the desktop, etc. For example, the startup monitoring and authorizing function may monitor operating system-level events pertaining to these requests.

It may be determined whether the site, the session, the system, or the application is authorized (block 410). For example, the startup monitoring and authorizing function of toolbar 155 may access the user's user profile information to determine whether the user is authorized to access and use the requested site, the requested session, the requested system, or the requested application. For example, as previously described, the user profile information may include a list of sites, sessions, systems, and applications that the user is authorized to access and use. Toolbar 155 may compare the requested site, session, system, or application with the list to determine whether the user is authorized to access and use the requested site, session, system, or application. By way of example, toolbar 155 may identify an object class name (e.g., an application name, a mainframe name, a site name), an object caption (e.g., name of file and name of application that is displayed if the file is open (e.g., Marketing Plan—Microsoft Word)) or some other type of site, session, system, or application identifier that is associated with the user's input and request.

If it is determined that the site, the session, the system, or the application is not authorized (block 410—NO), the request may be denied (block 415). For example, toolbar 155 may not provide an automated sign-on service. The user may not be able to access and use the requested site, session, or application.

If it is determined that the site, the session, the system, or the application is authorized (block 410—YES), it may be determined whether credentials are available (block 420). For example, toolbar 155 may access the user's user profile information to determine whether the user profile information includes user credentials for the requested site, session, system, or application.

If it is determined that credentials are not available (block 420—NO), the type of credentials may be identified (block 425). For example, as previously described, according to an exemplary embodiment, single credentials may include credentials that may be used to sign-on to a single site, session, system, or application, and group credentials may include credentials that may be used to sign-on to multiple sites, sessions, systems, and/or applications. Toolbar 155 may identify whether a single credential or a group credential may be needed to sign-on to the requested site, session, system, or application.

A monitoring to obtain credentials may be performed (block 430) and a prompt for user credentials may be provided (block 435). For example, the credential sensing function of toolbar 155 may provide a user interface to the user to enter user credentials. Toolbar 155 may monitor the input (e.g., keys entered, etc.) provided by the user with respect to the user interface.

Credentials may be saved (block 440). For example, toolbar 155 may obtain the user credentials provided by the user via the user interface. Toolbar 155 may store the user credentials with the user profile information. Toolbar 155 may also send the user credentials to database device 125 as an update to the user's user profile information.

Referring to FIG. 4B, credentials may be provided for an automated sign-on process (block 445). For example, the credential supplying function of toolbar 155 may supply the user credentials as a part of an automated sign-on process pertaining to the requested site, session, system, or application.

Referring back to 4A, if it is determined that credentials are available (block 420—YES), the credentials may be provided for an automated sign-on process (block 445), as illustrated in FIG. 4B. For example, toolbar 155 may supply the user credentials as a part of an automated sign-on process pertaining to the requested site, session, system, or application.

Although FIGS. 4A and 4B illustrate an exemplary process 400, according to other embodiments, process 400 may include additional operations, fewer operations, and/or different operations than those illustrated in FIGS. 4A and 4B and described. Additionally, or alternatively, according to other embodiments, one or more operations described as being performed by a particular device, may be performed by a different device or a combination of devices.

Depending on whether the user is requesting to access a site or a system, initiate a session, or launch an application, toolbar 155 may supply the user credentials in a different manner. Described below are exemplary processes pertaining to the supplying of user credentials.

Figure 5:
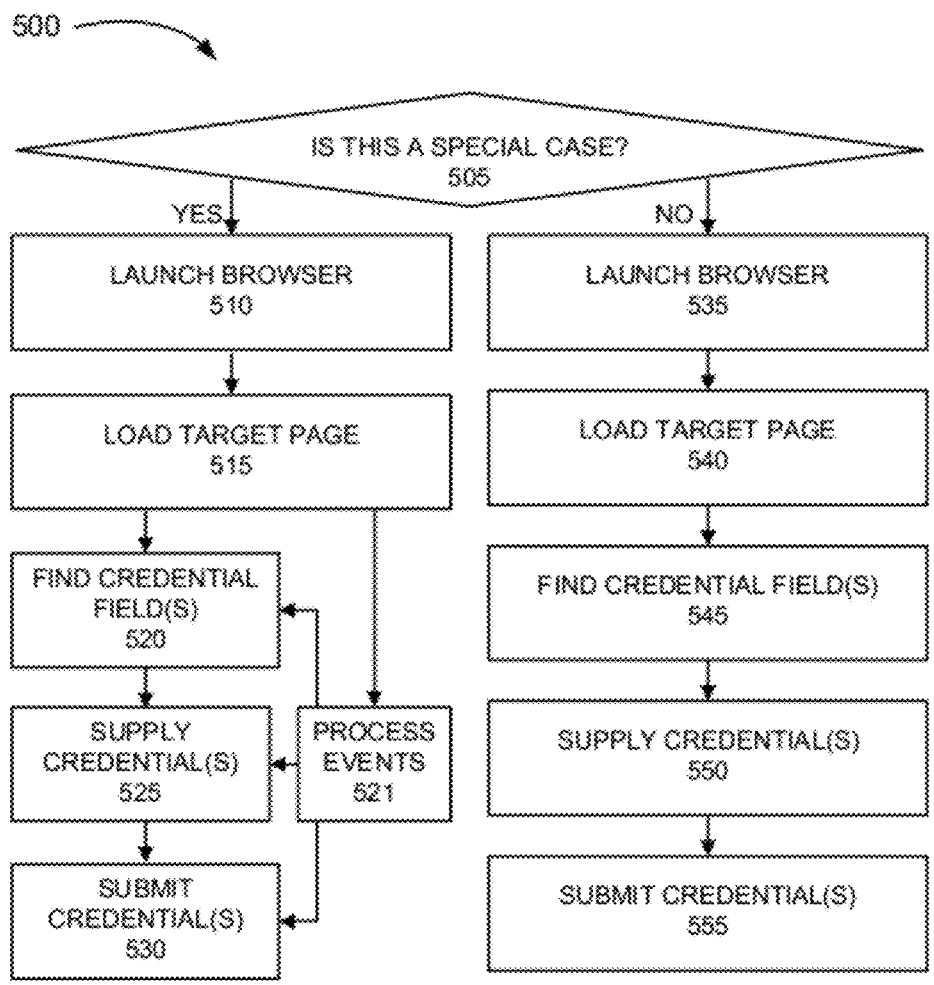
FIG. 5 is a flow diagram illustrating an exemplary process for providing an automated sign-on to a non-SSO web site.

FIG. 5 is a flow diagram illustrating an exemplary process 500 for providing an automated sign-on to a non-SSO web site. For this example, it may be assumed that toolbar 155 has already determined that the user is authorized to access and use the non-SSO site and toolbar 155 has the appropriate user credentials.

It may be determined whether the non-SSO site is a special case (block 505). For example, based on the non-SSO site being requested, toolbar 155 may determine whether the automated sign-on process for the non-SSO site includes processes in addition to finding and populating credential field(s). As an example, some non-SSO sites may require additional automated navigation and/or inputs due to pop-ups, prompts, or other types of events that may be triggered during sign-on or when connected to the non-SSO sites.

If it is determined that the non-SSO site is a special case (block 505—YES), toolbar 155 may launch a browser (block 510) and load a target page (block 515). For example, toolbar 155 may automatically launch a browser (e.g., a web browser) or some other type of user interface that is appropriate for the user to use to access and use the non-SSO site. Toolbar 155 may automatically load a target page of the non-SSO site. For example, the user profile information may include a URI or a URL of the non-SSO site. Toolbar 155 may use the URI or URL to navigate the browser to the target page. For instances in which the browser is already launched and the user is connected to one or multiple non-SSO site(s), and the user is requesting to access and use another non-SSO site, toolbar 155 may create another session with that other non-SSO site without having to launch the browser. For example, with reference to Internet Explorer, the browser permits a user to have multiple sessions, pages, etc., via respective tabs.

Once the target page is loaded, credential fields may be found (block 520), the credentials may be supplied to the fields (block 525), and the credentials may be submitted (block 530). Concurrently, toolbar 155 may process events that may occur during the finding of the credential field(s), supplying the credential(s), and submitting the credential(s) (block 521). For example, toolbar 155 may automatically locate a user identifier field and/or a password field provided by the non-SSO site. As an example, toolbar 155 may identify and select the user identifier field and/or the password field based on a name associated with fields included in or associated with the target page. Toolbar 155 may then, for example, automatically supply (e.g., fill-in) the appropriate credentials to those field(s) and submit those credential(s) (e.g., similar to pressing an Enter key, etc.). Toolbar 155 may also automatically manage other events that may occur to permit the finding, the supplying, and the submitting of the credentials.

Referring back to block 505, if it is determined that the non-SSO site is not a special case (block 505), toolbar 155 may launch a browser (block 510), load a target page (block 515), as well as finding credential field(s) (block 545), supplying the credential(s) (block 550), and submit the credential(s) (block 555). As previously described for the special case, toolbar 155 may provide the automated sign-on to the non-SSO site. However, in this case, toolbar 155 may not provide the functionality pertaining to block 521.

Although FIG. 5 illustrates an exemplary process 500, according to other embodiments, process 500 may include additional operations, fewer operations, and/or different operations than those illustrated in FIG. 5 and described. Additionally, or alternatively, according to other embodiments, one or more operations described as being performed by a particular device, may be performed by a different device or a combination of devices.

With reference to SSO sites, toolbar 155 may perform one or more operations analogous to those described in process 500. According to other embodiments, toolbar 155 may perform an automated sign-on according to conventional or existing approaches used by an SSO service. According to an exemplary embodiment, and with reference to SSO sites, toolbar 155 may include determining whether a session cookie is valid or expired. For example, as previously described, the session cookie may include a time-to-live. In the event the session cookie is expired, toolbar 155 may require the user to re-sign onto toolbar 155 before the SSO site is accessed. Assuming the re-sign on is successful, the user is authorized to access and use the SSO site, etc., toolbar 155 may then provide an automated sign-on service. However, if toolbar 155 determines that the session cookie is not expired, toolbar 155 may launch the browser or add another session to an already launched browser, load a target page, and perform the automated sign-in using the user's user credentials.

Figure 6:
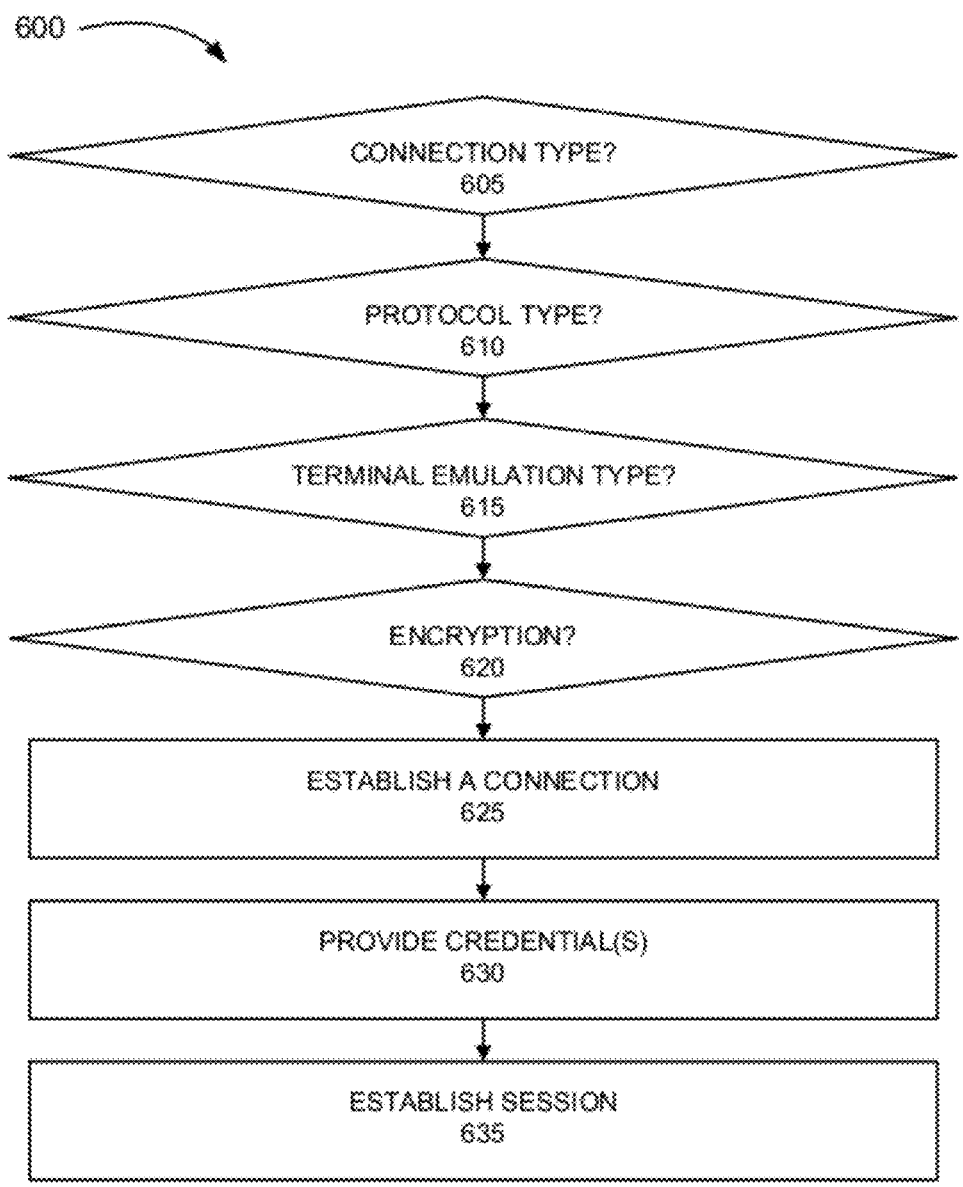
FIG. 6 is a flow diagram illustrating an exemplary process for providing an automated sign-on to a mainframe session and application.

FIG. 6 is a flow diagram illustrating an exemplary process 600 for providing an automated sign-on to a mainframe session and application. For this example, it may be assumed that toolbar 155 has already determined that the user is authorized to initiate a mainframe session and/or mainframe application and toolbar 155 has the appropriate user credentials.

A connection type may be determined (block 605). For example, toolbar 155 may determine whether a 3270 connection, a 5250 connection, a Virtual Terminal (VT) connection, or some other type of connection may be used to establish a connection between user device 150 and a mainframe 140.

A protocol may be determined (block 610). For example, toolbar 155 may determine whether the Telnet protocol, the Secure Shell protocol, or some other type of protocol may be used.

A type of terminal emulation may be determined (block 615). For example, toolbar 155 may determine whether terminal model (TM) 2 emulation, TM 5 emulation, Virtual Terminal 220 (VT 220) emulation, or some other type of emulation may be used.

It may be determined whether encryption will be used (block 620). For example, toolbar 155 may determine whether the Secure Sockets Layer (SSL) protocol, the Transport Layer Security (TLS) protocol, or some other type of cryptographic protocol may be used.

A connection may be established (block 625). For example, toolbar 155 may establish a connection between user device 150 and mainframe 140 based on the determined parameters of blocks 605, 610, 615, and 620.

Credentials may be provided (block 630). For example, toolbar 155 may supply credential(s) to mainframe 140 to permit a session to be established.

A session may be established (block 635). For example, toolbar 155 may submit (e.g., similar to pressing an Enter key, etc.) the user credentials to mainframe 140. Toolbar 155 may also manage other input(s), prompt(s), event(s), etc., to permit the session to be established.

Although FIG. 6 illustrates an exemplary process 600, according to other embodiments, process 600 may include additional operations, fewer operations, and/or different operations than those illustrated in FIG. 6 and described. For example, toolbar 155 may manage parameters (e.g., network address of mainframe 140, launching a user interface, etc.), other than those specifically described in process 600, to establish the session between user device 150 and mainframe 140. Additionally, or alternatively, once the session is established, toolbar 155 may manage an automated sign-on to a mainframe application, if one is needed to access and use a requested mainframe application. Additionally, or alternatively, toolbar 155 may not provide credentials (as illustrated and described with respect to block 630) to establish a session. For example, credentials may need to be supplied after a session is established and a mainframe application is requested. Other variations to process 600 may be implemented that are not specifically described herein. Additionally, or alternatively, according to other embodiments, one or more operations described as being performed by a particular device, may be performed by a different device or a combination of devices.

With reference to systems (e.g., user devices, network devices, etc.), toolbar 155 may perform operations similar to that of process 600. By way of example, toolbar 155 may determine the type of connection, the protocol, and whether encryption is to be used. Depending on the device, the type of connection, protocol, etc., may be different from that which may (typically) be used between a user device and a mainframe device. As an example, in some cases, the protocol may correspond to Bluetooth, the Internet Protocol (IP), etc. Toolbar 155 may establish a connection and provide the credentials to sign-on to the system.

With reference to applications (e.g., desktop applications, etc.), toolbar 155 may automatically populate fields and submit user credential(s) to permit a user to access and use an application. Similar to operations previously described, toolbar 155 may determine whether the user is authorized to access and use the application (e.g., based on user profile information), identify the type of credentials (e.g., single or group, etc.), and supply the appropriate credentials to the application in an automated manner.

According to an exemplary embodiment, in instances when the location of the application is not known by toolbar 155, toolbar 155 may prompt the user. For example, toolbar 155 may permit the user to enter path information or to browse the drive(s) accessible to user device 150. Toolbar 155 may then update location information pertaining to the application.

As previously described, according to an exemplary embodiment, toolbar 155 may include a cookie manager function. The cookie manager function may manage the life of a session cookie pertaining to a single sign-on session. For example, the cookie manager function may refresh a time-to-live of the session cookie when the user remains active on the user device within a particular time period. Described below are exemplary processes pertaining to the cookie manager function.

Figure 7:
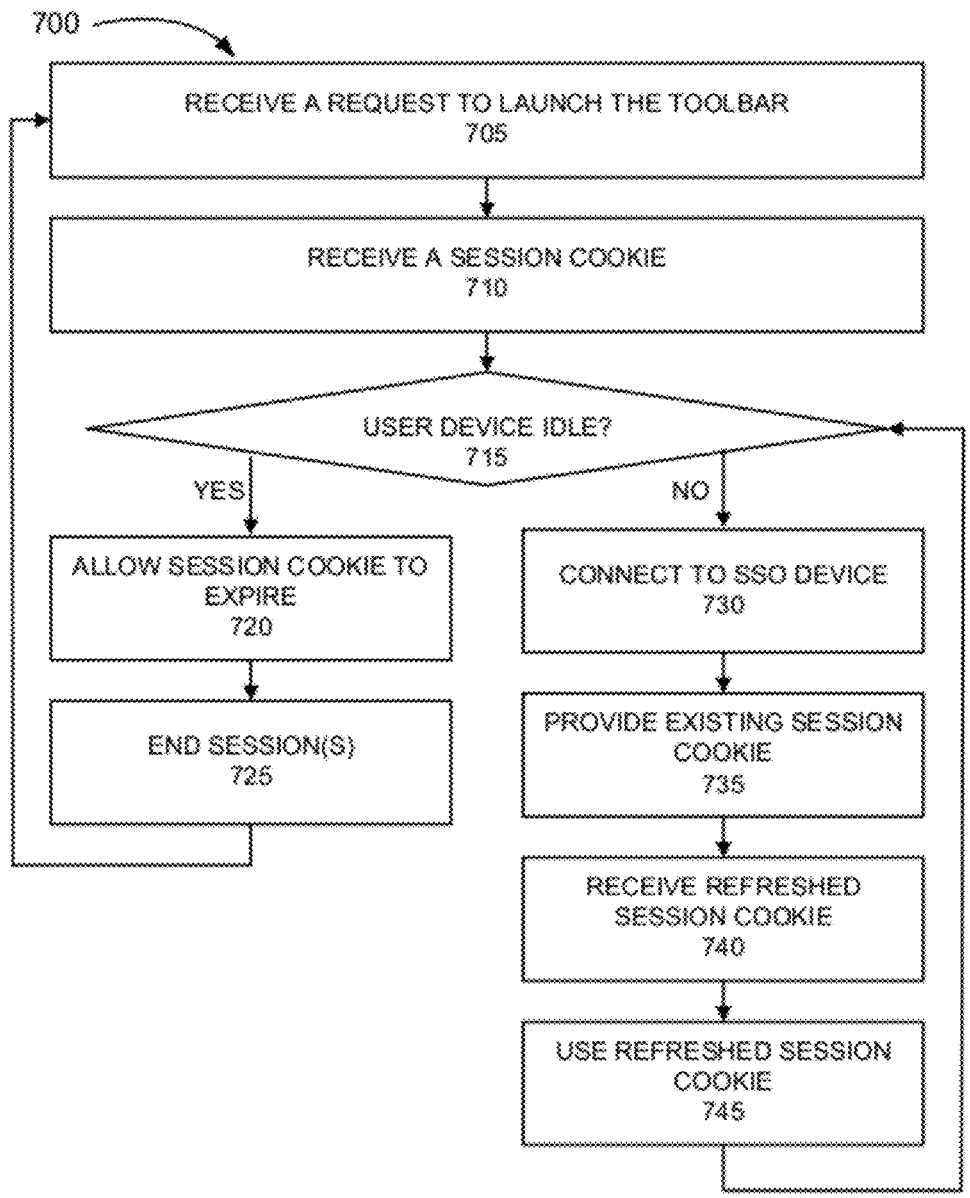
FIG. 7 is a flow diagram illustrating an exemplary process for automatically refreshing a session cookie.

FIG. 7 is a flow diagram illustrating an exemplary process 700 for automatically refreshing a session cookie. According to an exemplary embodiment, the refreshing of the session cookie may only pertain to SSO sites. Additionally, or alternatively, according to an exemplary embodiment, a single session cookie may be used when a user accesses and uses one or multiple SSO sites. According to other embodiments, the refreshing of the session cookie may pertain to non-SSO sites, etc.

A request to launch the toolbar may be received (block 705) and a session cookie may be received (block 710). For example, similar to operations illustrated in FIGS. 1B-1E and described, toolbar 155 may receive a user request to sign-on to toolbar 155. Toolbar 155 may receive a session cookie from SSO device 115.

It may be determined whether the user device is idle (block 715). For example, toolbar 155 may continuously monitor the activity (or inactivity) on user device 150. For example, toolbar 155 may monitor user input. Toolbar 155 may determine whether user device 150 is idle for a duration equivalent to a predetermined time.

If it is determined that the user device is idle (block 715—YES), the session cookie may be allowed to expire (block 720). For example, toolbar 155 may allow a time-to-live of the session cookie to expire. Under such circumstances, existing session(s) may end and an attempt to start a new SSO session may not be allowed (block 725). The user may be prompted to re-sign-on to toolbar 115 and process 700 may continue beginning at block 705.

If it is determined that the user device is not idle (block 715—NO), the toolbar may connect to the SSO device (block 730). For example, toolbar 155 may periodically or aperiodically refresh the session cookie when user device 150 is active. During such circumstances, toolbar 155 may send a refresh session cookie request to SSO device 115. The refresh session cookie request may include the current session cookie.

The existing session cookie may be provided (block 735). For example, SSO device 115 may receive the refresh session cookie request and retrieve the session cookie. SSO device 115 may inspect the current session cookie, validate the session cookie, and refresh the timestamp (or time-to-live) to a new time or time period. SSO device 115 may send a refresh session cookie response to toolbar 155 via user device 150. The refresh session cookie response may include a refreshed session cookie.

A refreshed session cookie may be received (block 740). For example, toolbar 155 may receive the refresh session cookie response that includes the refreshed session cookie.

The refreshed session cookie may be used (block 745). For example, toolbar 155 may use the refreshed session cookie as it pertains to any SSO active or open session(s), new SSO session, etc. Process 700 may continue to block 715.

Although FIG. 7 illustrates an exemplary process 700, according to other embodiments, process 700 may include additional operations, fewer operations, and/or different operations than those illustrated in FIG. 7 and described. Additionally, or alternatively, according to other embodiments, one or more operations described as being performed by a particular device, may be performed by a different device or a combination of devices.

Figure 8:
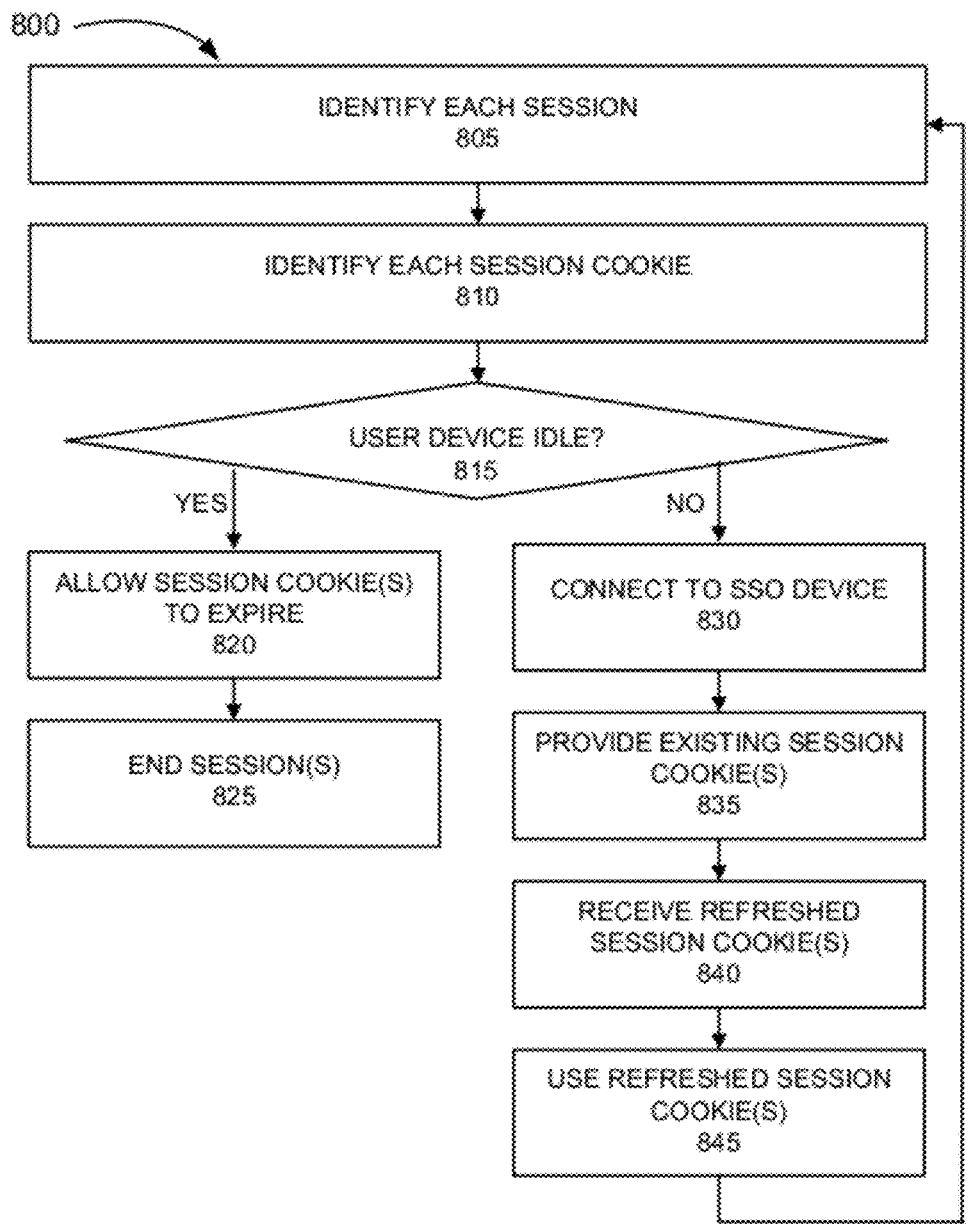
FIG. 8 is a flow diagram illustrating an exemplary process for automatically refreshing a session cookie when the user manually signs-on to an SSO site.

FIG. 8 is a flow diagram illustrating an exemplary process 800 for automatically refreshing session cookies when the user manually signs-on to SSO sites. For example, the user may launch a browser from his/her desktop and manually sign-on to one or multiple SSO sites.

Identify each session (block 805). For example, toolbar 155 may identify each SSO session that is active or open.

Identify each session cookie (block 810). For example, toolbar 155 may identify each session cookie associated with each session. For example, toolbar 155 may access a particular folder on user device 150 that stores the session cookies pertaining to SSO sites.

It may be determined whether the user device is idle (block 815). For example, toolbar 155 may continuously monitor the activity (or inactivity) on user device 150. For example, toolbar 155 may monitor user input. Toolbar 155 may determine whether user device 150 is idle for a duration equivalent to a predetermined time.

If it is determined that the user device is idle (block 815—YES), the session cookie(s) may be allowed to expire (block 820). For example, toolbar 155 may allow a time-to-live of the session cookie(s) to expire. Under such circumstances, existing session(s) may end (block 825). The user may be prompted to sign-on to toolbar 115 or the user may re-launch the browser from his/her desktop, etc.

If it is determined that the user device is not idle (block 815—NO), the toolbar may connect to the SSO device (block 730). For example, toolbar 155 may periodically or aperiodically refresh each session cookie when user device 150 is active. During such circumstances, toolbar 155 may send a refresh session cookie request to SSO device 115. The refresh session cookie request may include the current session cookie(s).

The existing session cookie(s) may be provided (block 835). For example, SSO device 115 may receive the refresh session cookie request and retrieve the session cookie(s). SSO device 115 may inspect the current session cookie(s), validate the session cookie(s), and refresh the timestamp (or time-to-live) to a new time or time period. SSO device 115 may send a refresh session cookie response to toolbar 155 via user device 150. The refresh session cookie response may include one or multiple refreshed session cookie(s).

A refreshed session cookie may be received (block 840). For example, toolbar 155 may receive the refresh session cookie response that includes the refreshed session cookie(s).

The refreshed session cookie(s) may be used (block 845). For example, toolbar 155 may use the refreshed session cookie(s) as it pertains to any SSO active or open session(s), new SSO session, etc. Process 800 may continue to block 805.

Although FIG. 8 illustrates an exemplary process 800, according to other embodiments, process 800 may include additional operations, fewer operations, and/or different operations than those illustrated in FIG. 8 and described. Additionally, or alternatively, according to other embodiments, one or more operations described as being performed by a particular device, may be performed by a different device or a combination of devices.

According to an exemplary embodiment and with reference to exemplary processes 700 and 800, toolbar 155 may identify when user device 150 is idle based on other factors. For example, toolbar 155 may monitor and detect when a screensaver is activated, when the user has to re-sign-on to user device 150 (e.g., locked out), or other operating system states indicating inactivity (e.g., sleep mode, hibernation mode, etc.). Toolbar 155 may consider one or more of these events as equivalent to user device 150 being idle.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks have been described with regard to the processes illustrated in FIGS. 4A, 4B, and 5-8, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processing system 305, etc.), a combination of hardware and software (e.g., applications 315), a combination of hardware and firmware, or a combination of hardware, software, and firmware. The implementation of software or firmware has been described without reference to the specific software code since software can be designed to implement the embodiments based on the description herein. Additionally, a computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method comprising:
    receiving, by a toolbar application of a user device and from a user of the user device, a sign-on request to sign-on to the toolbar application, wherein the toolbar application is resident on the user device;
    determining whether the sign-on request is valid;
    receiving, by the toolbar application, user profile information pertaining to the user in response to determining that the sign-on request is valid;
    receiving a request to connect to a single sign-on site, to connect to a non-single sign-on site, to connect to a system, to initiate a mainframe session, or to use a mainframe application or a user device application resident on the user device, wherein the toolbar application is capable of receiving the request via any of the toolbar application, a graphical element on a desktop associated with the user device, a graphical element in a taskbar associated with the user device, and a graphical element in a system tray associated with the user device;
    determining, by the toolbar application of the user device, whether the user is authorized to connect to, initiate, or use the single sign-on site, the non-single sign-on site, the system, the mainframe session, the mainframe application, or the user device application based on the user profile information;
    selecting, by the toolbar application of the user device, one or more user credentials to allow the user to connect to, initiate, or use the single sign-on site, the non-single sign-on site, the system, the mainframe session, the mainframe application, or the user device application in response to determining that the user is authorized; and
    signing-on, by the toolbar application of the user device, to the single sign-on site, the non-single sign-on site, the system, the mainframe session, the mainframe application, or the user device application based on the selected one or more user credentials, wherein the toolbar application is capable of performing the receiving, the determining, the selecting, and the signing-on, pertaining to the single sign-on site, the non-single sign-on site, the system, the mainframe session, the mainframe application, and the user device application.

2. The method of claim 1, further comprising:
    monitoring user input when it is determined that the one or more user credentials are not available;
    prompting the user to input the one or more user credentials; and
    obtaining the one or more user credentials based on the user's input.

3. The method of claim 1, wherein the determining whether the user is authorized comprises:
    comparing the user profile information with the request to connect to the single sign-on site, to connect to the non-single sign-on site, to connect to the system, to initiate the mainframe session, or to use the mainframe application or the user device application; and
    determining if the user is authorized based on the comparing.

4. The method of claim 1, wherein when the request is to connect to the non-single sign-on site, the signing-on further comprising:
    determining whether the non-single sign-on site requires at least one of a navigational input, a prompt input, or a pop-up input to permit an automated sign-on; and
    selecting one of multiple automated sign-on processes based on the determining.

5. The method of claim 4, wherein the one of the multiple automated sign-on processes comprises:
    launching a browser;
    loading a target page of the non-single sign-on site;
    locating one or more credential fields on the target page; and
    submitting the one or more user credentials to the one or more credentials fields.

6. The method of claim 4, wherein the one of the multiple automated sign-on processes comprises:
    launching a browser;
    loading a target page of the non-single sign-on site;
    locating one or more credential fields; and
    submitting the one or more user credentials, wherein the one of the multiple automated sign-on processes includes managing the at least one of the navigational input, the prompt input, or the pop-up input when performing the locating and the submitting.

7. The method of claim 1, wherein when the request is to initiate the mainframe session, the signing-on further comprising:
    determining a connection type;
    determining a protocol type;
    determining a terminal emulation type;
    launching a user interface and establishing a connection between the user device and a mainframe device based on the determined connection type, the protocol, and the terminal emulation; and
    providing the one or more user credentials to establish the mainframe session.

8. The method of claim 1, wherein the toolbar application is capable of detecting the request based on monitoring operating system events.

9. The method of claim 1, further comprising:
receiving in response to the sign-on request a session cookie;
monitoring a time-to-live of the session cookie;
refreshing the time-to-live of the session cookie when the user device is not inactive; and
inactivating the toolbar application and allowing the session cookie to expire when the user device is inactive.

10. The method of claim 1, wherein the selecting comprises:
identifying whether the user profile information includes the one or more user credentials for permitting the user to connect to the single sign-on site, to connect to the non-single sign-on site, to connect to the system, to initiate the mainframe session, or to use the mainframe application or the user device application;
selecting the one or more user credentials when the user profile information includes the one or more user credentials; and
prompting the user for the one or more user credentials when the user profile information does not include the one or more user credentials.

11. A user device comprising:
a transceiver;
a memory to store instructions of a toolbar application; and
at least one processing system to execute the instructions of the toolbar application to:
receive a sign-on request to sign-on to the toolbar application from a user of the user device, wherein the toolbar application is resident on the user device;
receive user profile information pertaining to the user when the user successfully signs-on to the toolbar application;
receive a request to connect to a single sign-on site, to connect to a non-single sign-on site, to connect to a system, to initiate a mainframe session, or to use a mainframe application or a user device application resident on the user device, wherein the toolbar application is capable of receiving the request via any of the toolbar application, a graphical element on a desktop associated with the user device, a graphical element in a taskbar associated with the user device, and a graphical element in a system tray associated with the user device;
determine whether the user is authorized to connect to, initiate, or use the single sign-on site, the non-single sign-on site, the system, the mainframe session, the mainframe application, or the user device application based on the user profile information;
select one or more user credentials to allow the user to connect to, initiate, or use the single sign-on site, the non-single sign-on site, the system, the mainframe session, the mainframe application, or the user device application in response to a determination that the user is authorized; and
sign-on to the single sign-on site, the non-single sign-on site, the system, the mainframe session, the mainframe application, or the user device application based on the selected one or more user credentials, wherein the toolbar application is capable of performing the receiving, the determining, the selecting, and the signing-on, pertaining to the single sign-on site, the non-single sign-on site, the system, the mainframe session, the mainframe application, and the user device application.

12. The user device of claim 11, wherein the at least one processing system to execute the instructions of the toolbar application to:
monitor user input when it is determined that the one or more user credentials are not available;
prompt the user to input his/her one or more user credentials; and
capture inputted one or more user credentials.

13. The user device of claim 11, wherein when determining that the user is authorized, the at least one processing system to execute the instructions of the toolbar application to:
compare the user profile information with the request to connect to the single sign-on site, to connect to the non-single sign-on site, to connect to the system, to initiate the mainframe session, or to use the mainframe application or the user device application; and
determine if the user is authorized based on the comparing.

14. The user device of claim 11, wherein the at least one processing system to execute the instructions of the toolbar application to:
determine whether the non-single sign-on site requires at least one of a navigational input, a prompt input, or a pop-up input to permit an automated sign-on; and
select one of multiple automated sign-on processes based on the determining.

15. The user device of claim 14, wherein the at least one processing system to execute the instructions of the toolbar application to:
launch a browser;
load a target page of the non-single sign-on site;
locate one or more credential fields; and
submit the one or more user credentials.

16. The user device of claim 14, wherein the at least one processing system to execute the instructions of the toolbar application to:
launch a browser;
load a target page of the non-single sign-on site;
locate one or more credential fields; and
submit the one or more user credentials, wherein when performing the locating and the submitting the toolbar is configured to manage at least one of a navigational input, a prompt input, or a pop-up input.

17. The user device of claim 11, wherein the at least one processing system to execute the instructions of the toolbar application to:
determine a connection type;
determine a protocol;
determine a terminal emulation;
launch a user interface and establish a connection between the user device and a mainframe device based on the determined connection type, the protocol, and the terminal emulation; and
provide the one or more user credentials to establish the mainframe session.

18. The user device of claim 11, wherein the at least one processing system to execute the instructions of the toolbar application to:
receive in response to the sign-on request a session cookie;
monitor a time-to-live of the session cookie;
refresh the time-to-live of the session cookie when the user device is not inactive; and inactivate the toolbar application and allowing the session cookie to expire when the user device is inactive.

19. The user device of claim 11, wherein the toolbar application is capable of detecting the request based on monitoring operating system events occurring on the user device.

20. A non-transitory computer-readable medium comprising instructions of a toolbar application resident on a user device and executable by at least one processing system of the user device, the instructions comprising instructions to:
receive a sign-on request to sign-on to the toolbar application from a user of the user device;
receive user profile information pertaining to the user when the user successfully signs-on to the toolbar application;
receive a request to connect to a single sign-on site, to connect to a non-single sign-on site, to connect to a system, to initiate a mainframe session, or to use a mainframe application or a user device application resident on the user device, wherein the toolbar application is capable of receiving the request via any of the toolbar application, a graphical element on a desktop associated with the user device, a graphical element in a taskbar associated with the user device, and a graphical element in a system tray associated with the user device;
determine whether the user is authorized to connect to, initiate, or use the single sign-on site, the non-single sign-on site, the system, the mainframe session, the mainframe application, or the user device application based on the user profile information;
select one or more user credentials to allow the user to connect to, initiate, or use the single sign-on site, the non-single sign-on site, the system, the mainframe session, the mainframe application, or the user device application in response to a determination that the user is authorized; and
sign-on to the single sign-on site, the non-single sign-on site, the system, the mainframe session, the mainframe application, or the user device application based on the selected one or more user credentials, wherein the instructions are capable of performing the receiving, the determining, the selecting, and the signing-on, pertaining to the single sign-on site, the non-single sign-on site, the system, the mainframe session, the mainframe application, and the user device application.

21. The non-transitory computer-readable medium of claim 20, comprising instructions that further cause the at least one processing system to:
display the toolbar application to the user, wherein the toolbar application includes one or more user interfaces to allow the user to make the request.

22. The non-transitory computer-readable medium of claim 21, wherein the toolbar application is capable of detecting the request based on monitoring operating system events.

23. The non-transitory computer-readable medium of claim 20, comprising instructions that further cause the at least one processing system to:
launch a browser;
load a target page;
locate one or more credential fields on the target page; and
submit the one or more user credentials.

24. The non-transitory computer-readable medium of claim 20, comprising instructions that further cause the at least one processing system to:
determine a connection type;
determine a protocol;
determine a terminal emulation;
launch a user interface and establish a connection between the user device and a mainframe device based on the determined connection type, the protocol, and the terminal emulation; and
provide the one or more user credentials to establish the mainframe session.

25. The non-transitory computer-readable medium of claim 20, comprising instructions that further cause the at least one processing system to:
monitor user input when it is determined that the one or more user credentials are not available;
prompt the user to input his/her one or more user credentials; and
capture and save one or more user credentials based on the user's input.

* * * * *